United States Patent [19]

Bird

[11] Patent Number: 5,397,143
[45] Date of Patent: Mar. 14, 1995

[54] FOLDING STEPS

[76] Inventor: Ronald C. Bird, 2602 Wolf Point Dr., Rochester, Ind. 46975

[21] Appl. No.: 840,544

[22] Filed: Feb. 25, 1992

[51] Int. Cl.⁶ ............................................. B60R 3/02
[52] U.S. Cl. ................................................. 280/166
[58] Field of Search .................. 280/166, 163; 182/97

[56] References Cited

U.S. PATENT DOCUMENTS

| | | | |
|---|---|---|---|
| 3,392,990 | 7/1968 | Wolf | 280/163 |
| 3,912,298 | 10/1975 | Humprey | 280/166 |
| 3,997,211 | 12/1976 | Graves | 280/163 |
| 4,108,457 | 8/1978 | Garrett | 280/166 |
| 4,720,116 | 1/1988 | Williams et al. | 280/166 |
| 4,982,974 | 1/1991 | Guidry | 280/166 |

Primary Examiner—Eric D. Culbreth
Attorney, Agent, or Firm—James D. Hall

[57] ABSTRACT

A staircase that is collapsible and hinged to the side of a vehicle allowing it to be folded up against the side of the vehicle for travel on roads. A pair of guide rods are connected at one end to the vehicle and at the opposite end to staircase for stabilizing the staircase when it rests upon an uneven ground. A pin is attached to the vehicle and can be inserted through a hole in the staircase locking the staircase when folded up.

1 Claim, 4 Drawing Sheets

FOLDING STEPS

BACKGROUND OF THE INVENTION

This invention relates to the outside steps on recreational and industrial trailers, motor homes, or other similar recreational vehicles. In these vehicles, the outside doors leading into the storage or dwelling section are often located at a considerable height above the ground because of the vehicle wheels. A staircase is often placed between the ground ad door entrance to aid in entering and exiting the vehicle.

However, staircases enlarge the width of the vehicle making it sometimes illegal to drive on roads. One solution to this problem is to install a staircase that can be removed. But, it is very inconvenient and time consuming to remove the staircase for traveling the reassemble the staircase for use.

SUMMARY OF THE INVENTION

The present invention utilizes a staircase that can be easily folded against the side of the vehicle so as to reduce the vehicle's width within the legal limit for traveling. A locking device is attached to the vehicle to secure the staircase in its folded position for storage. The steps are pivotally secured to rails allowing the steps to collapse and be compacted, The staircase is hinged to the side of the vehicle. A handrail assembly may also be used as a part of the staircase. Guide rods are attached between the vehicle and staircase for minimizing movement of the staircase when the staircase does not rest upon an even surface.

It is an object of this invention to provide a portable staircase on a recreational vehicle that can be compacted and folded up against the side of the vehicle for storage.

It is another object of this invention to provide a staircase in which its movement is minimized daring use when the staircase does not rest upon an even surface.

Other objects will become apparent upon a reading of the following description.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use so that others skilled in the art may follow its teachings.

Figure 1:
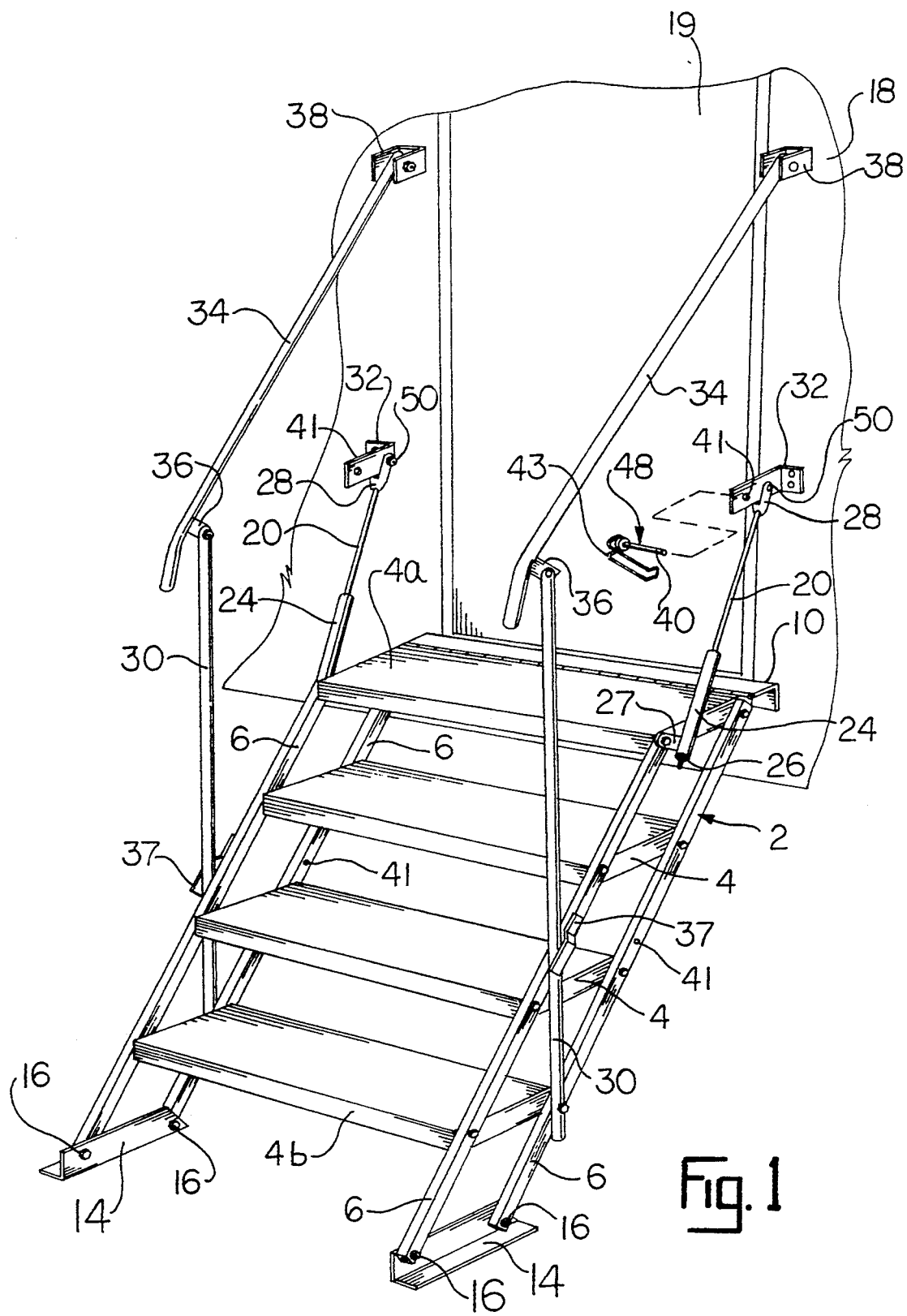
FIG. 1 shows the perspective view of the step staircase attached to a recreational vehicle in its unfolded position.
Figure 2:
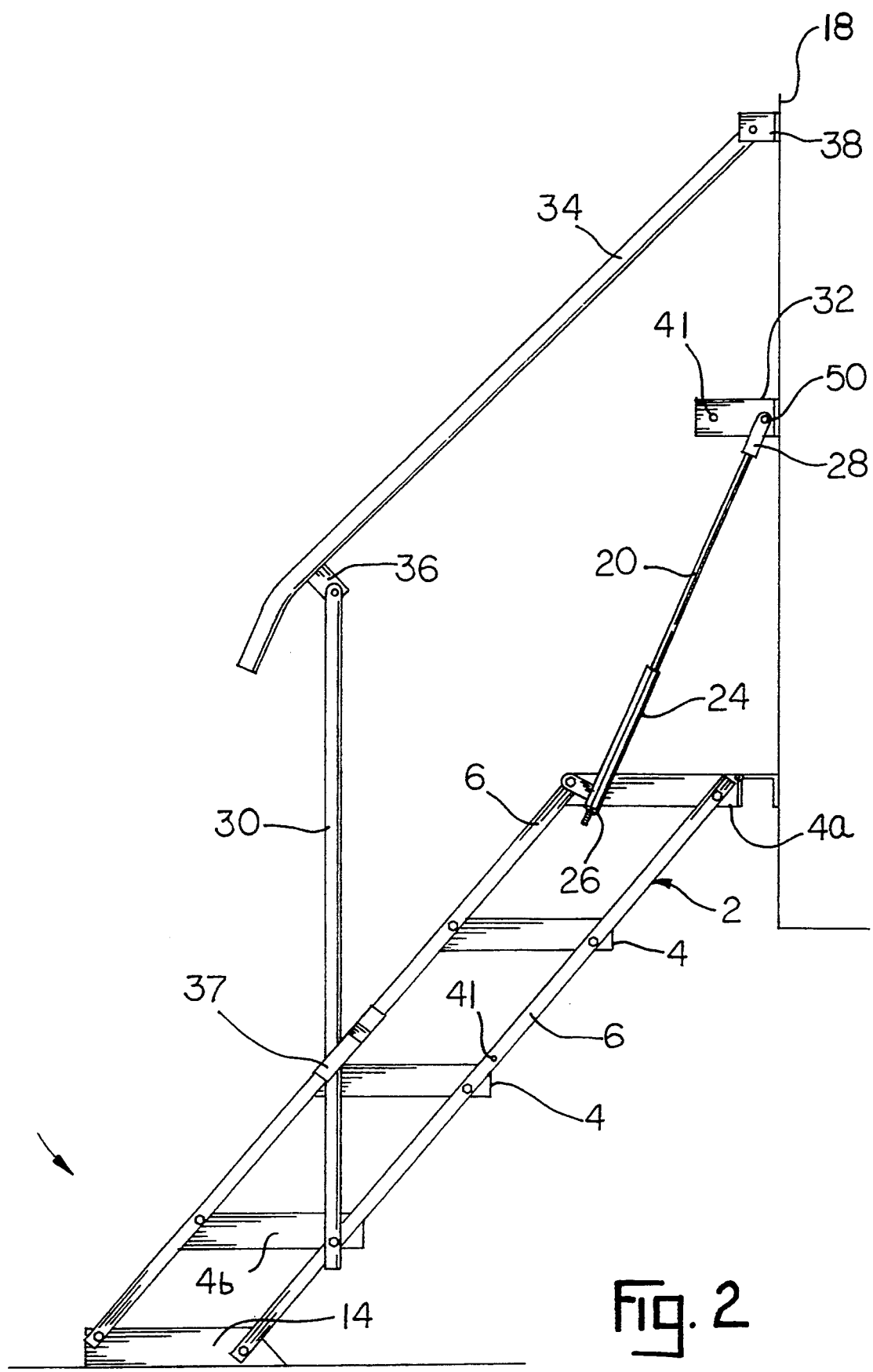
FIG. 2 is a side view of FIG. 1.

The staircase 2 includes a plurality of steps 4 as illustrated in FIG. 1 and 2 with each step being pivotally secured at opposite sides to a pair of side nails 6. The uppermost step 4a is hingedly connected to a step bracket 10 that is bolted to the side of the vehicle 18 below a door 19. Side rails 6 at each side of the staircase are generally parallel with each other and extend beyond the lowermost step 4b. A pod 14 in the form of an L-shaped bracket is mounted to the lower end of each rail 6 and fastened there by bolts 16.

A pair of guide rods 20 are attached between the vehicle and staircase 2. Each guide rod extends freely through a sleeve 24 and has a threaded end upon which a nut 26 is turned. A yoke 28 is fastened to the other end of each guide rod 20. Each yoke 28 is fastened by a pin 50 to an L-shaped bracket 32 that is bolted to the side of the vehicle 18. A handrail 34 extends along each side of steps 4. Each handrail 34 is pivotally secured at one end to a U-shaped bracket 38 connected to the vehicle. An outset retainer bracket 37 is preferably welded at one end to each of the uppermost rails at their outer sides. A leg 30 is pivotally secured to a bracket 36 welded to each handrail 34 at its opposite end. Each leg 30 is inserted between a retainer bracket 37 and its connected rail to prevent lateral movement relative to transverse axis of the handrail. A lock pin 48 with a clasp 43 attached is inserted through hole 41 in bracket 32 attached to vehicle 18.

In operation, the steps are shown in FIG. 1 in their extended and folded position for use. Each sleeve 24 abuts against a nut 26 and is welded at its lower end to a bracket 27 which is pivotably connected to the uppermost step. The two guide rods 20 in conjunction with the sleeves 24 stabilize the steps if the pods rest upon uneven ground.

Figure 3:
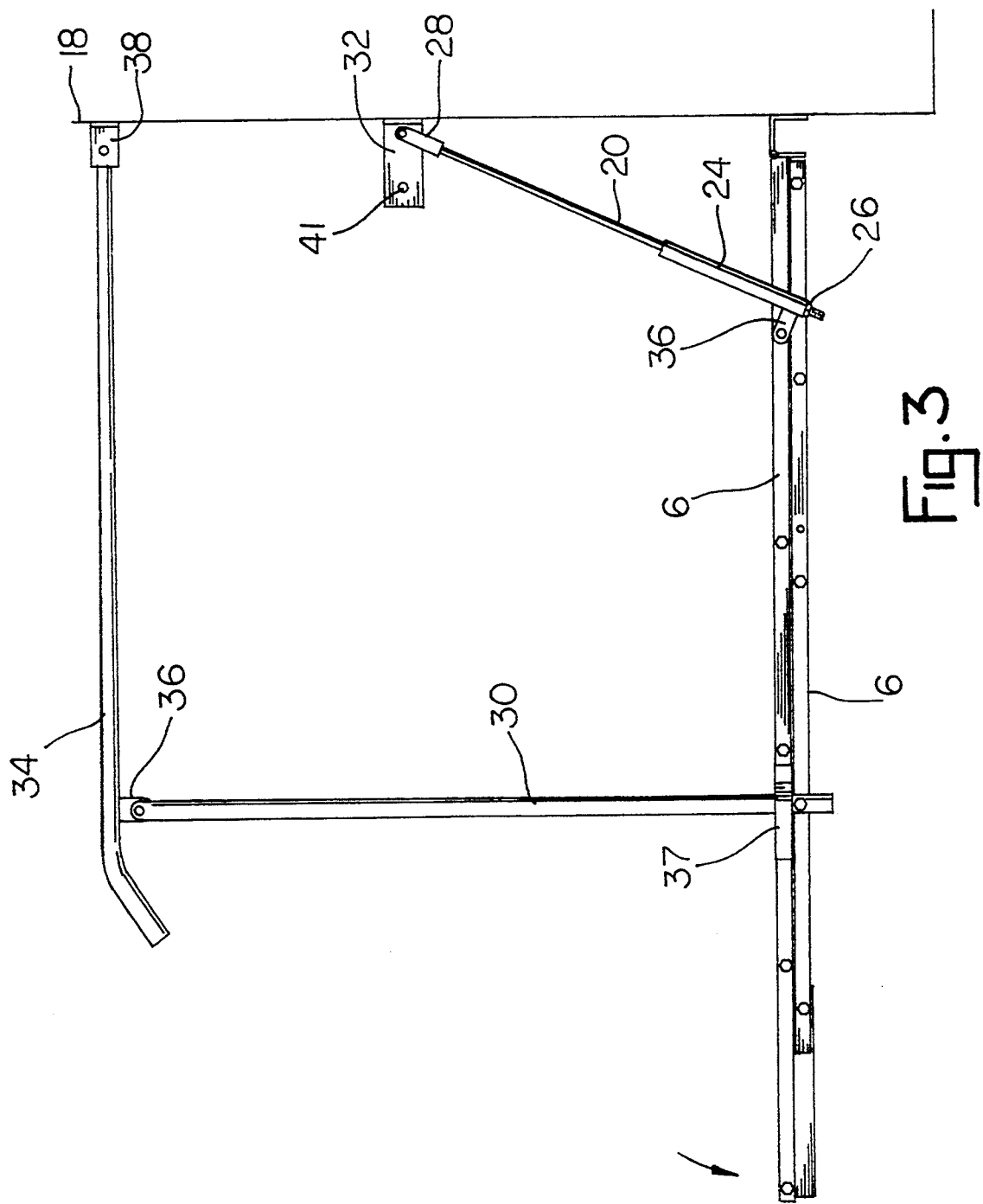
FIG. 3 is an enlarged side view of the staircase being collapsed and shown in an intermediate position.

FIG. 3 illustrates the steps being folded as extended from the side of the vehicle 18. The handrails 34 pivotally move relative to the side of the vehicle upwardly and away from the side of the vehicle, extending generally perpendicular to the side.

Figure 4:
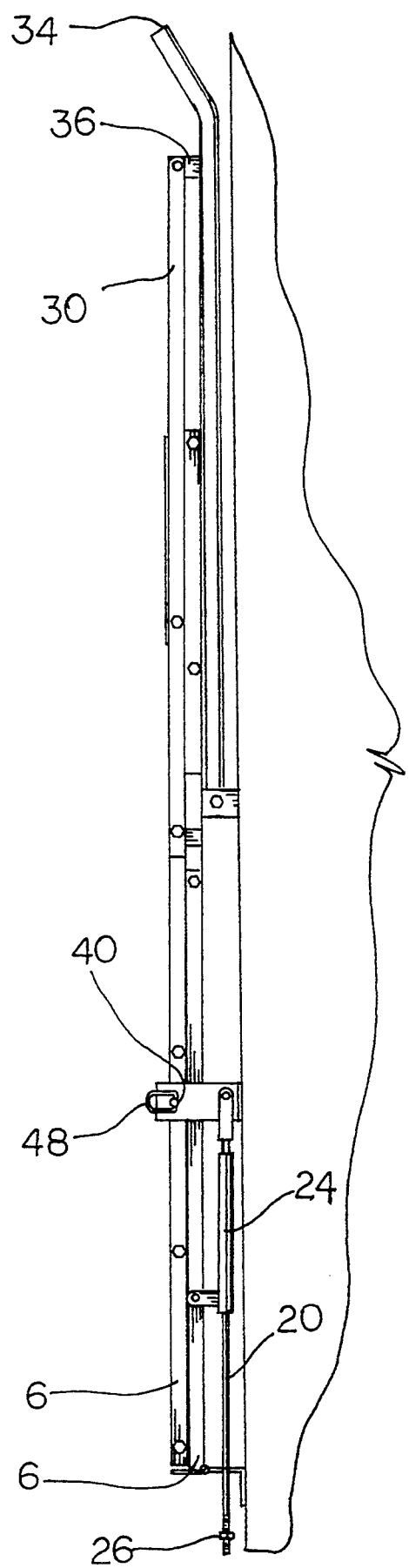
FIG. 4 shows the staircase in its collapsed and folded position secured against the side of the recreational vehicle.

FIG. 4 shows the steps collapsed and folded against the side of the vehicle in its upper storage position. Each handrail 34, leg 30, rails 6, and guide rod 20 are all pivotally moved upwardly relative to the vehicle and are secured by the lock pin 48 (only one shown in FIG. 4) in a stored collapsed position against the side of the vehicle. The pin part 40 of each lock pin 48 is inserted through aligned holes 41 formed in the lower outer rail 6 and L-shaped bracket 32. Safety catch 43 is swung over pin part 40 preventing removal of pin.

It is understood that the above description does not limit the invention to the given details, but may be modified within the scope of the following claims.

I claim:

1. A vehicle having an exterior wall, said vehicle comprising an exterior staircase pivotally connected to the vehicle at said wall, said staircase having a frame and steps, said steps being foldable in a collapsed position and unfoldable in a use position, said staircase being shiftable from a downward use position into an upper storage position with said steps being folded in said collapsed position, said staircase including a handrail, rotational means for shifting said handrail from a position generally parallel with said staircase when said staircase is in said downward use position to a generally vertical position adjacent said exterior wall when said staircase is in said upper storage position, said rotational means including a bracket attached to said exterior wall, said handrail being pivotally secured to said bracket at one end, said handrail including a leg having an upper part and a lower part, said upper part of said leg being pivotably secured to the opposite end of said handrail, means for minimizing lateral movement of said handrail and said leg when said staircase is in its downward use position, said lateral movement minimizing means including a bracket attached to said staircase, said leg extending between said bracket and said staircase when said staircase is in said downward use position.

* * * * *